United States Patent

Roach et al.

[11] 3,942,252
[45] Mar. 9, 1976

[54] RULE PROTRACTOR

[76] Inventors: Daniel F. Roach; George Spector, both of 3615 Woolworth Bldg., 233 Broadway, New York, N.Y. 10007

[22] Filed: Aug. 26, 1974

[21] Appl. No.: 500,477

[52] U.S. Cl. .................. 33/75 R; 33/119; 33/120
[51] Int. Cl.² ................................. B43L 7/00
[58] Field of Search ........ 33/75, 117, 119, 120, 115

[56] References Cited
UNITED STATES PATENTS

| 843,459 | 2/1907 | Humes | 33/115 |
| 932,907 | 8/1909 | Rydman | 33/75 R |
| 935,860 | 10/1909 | Probst | 33/120 |
| 940,439 | 11/1909 | Dolph | 33/119 |
| 1,161,761 | 11/1915 | Barker | 33/117 |
| 1,161,961 | 11/1915 | Pearl | 33/117 |
| 1,840,135 | 1/1932 | Schutt | 33/75 R |

FOREIGN PATENTS OR APPLICATIONS

| 717,327 | 10/1954 | United Kingdom | 33/75 R |

*Primary Examiner*—Richard E. Aegerter
*Assistant Examiner*—John W. Shepperd

[57] ABSTRACT

A quadrant for use by draftsmen; the device consisting of two arms attached pivotally together at one end, and including degree calibration, so the angle between the arms is readily read, and the device including locking means whereby the angle between the arms can be maintained fixed.

1 Claim, 11 Drawing Figures

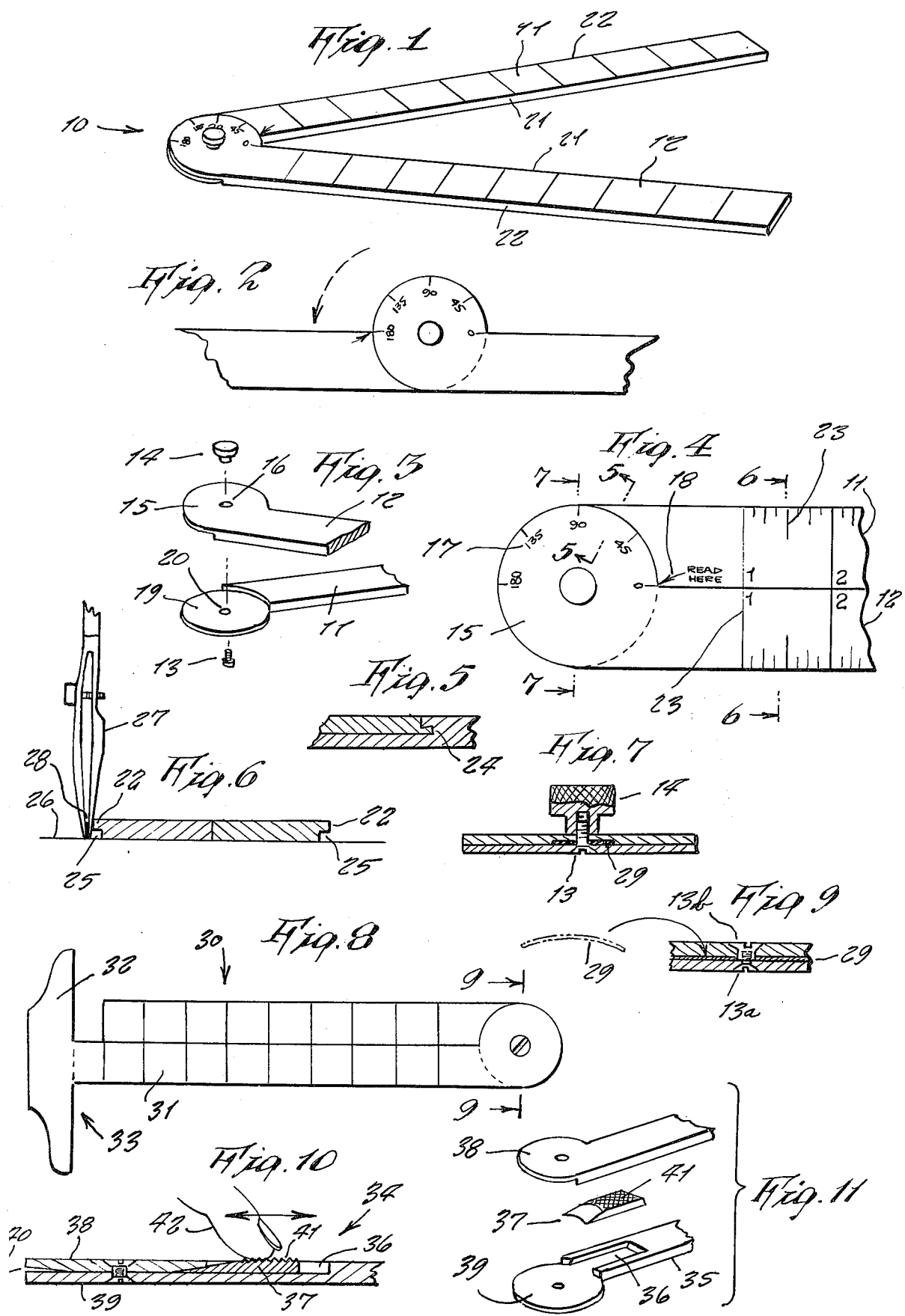

RULE PROTRACTOR

This invention relates generally to protractor devices.

A principle object of the present invention is to provide a drafting quadrant in which two straight arms are pivotally attached together at one end, and a degree scale is provided around a pivot hub of one of the arms so that the angle between the arms is known.

Another object is to provide a drafting quadrant in which a quick operating lock is incorporated so to lock the arms at any fixed angle therebetween.

Still another object is to provide a drafting quadrant in which the arm ruling edges are notched out along their lower portions so that a blot made by an inking implement such as a ruling pen or ordinary pen does not run down upon the drawing surface.

Still another object is to provide drafting quadrant which can be made in different sizes so to be practical for use either by draftsmen, engineers, or layout men in sheet metal fabrication.

Other objects are to provide a drafting quadrant which is simple in design, inexpensive to manufacture, rugged in construction, easy to use and efficient in operation.

There and other objects will be readily evident upon a study of the following specification and the accompanying drawing wherein:

FIG. 1 is a perspective view of one design of the invention.

FIG. 2 is a top view thereof shown fully opened.

FIG. 3 is an exploded view of the parts thereof.

FIG. 4 is an enlarged detail of a modified design thereof.

FIG. 5 is a cross sectional view on line 5—5 of FIG. 4.

FIG. 6 is a cross sectional view on line 6—6 of FIG. 4.

FIG. 7 is a cross sectional view on line 7—7 of FIG. 4.

FIG. 8 is a top view of a further modified design thereof which also incorporates a T-square.

FIG. 9 is a cross sectional view on line 9—9 of FIG. 8.

FIG. 10 is a cross section of another modified design of the invention in which a wedge is slidable between the two arms so to lock them in a set position.

FIG. 11 is an exploded perspective view of the structure of FIG. 10.

Referring now to the drawing in detail, and more particularly to FIGS. 1 through 7 thereof at this time, the reference numeral 10 represents a drafting quadrant wherein the same consists of a pair straight, flat arms 11 and 12 which at their one ends are pivotally held together by a screw 13 engaged by a knurled lock nut 14, for being manually turned in order to fixedly lick the arms together at any specific angle. One of the arms 12 has a circular hub 15 having a central hole 16 through which the screw is passed, the hub peripheral edge being marked out with degree calibrations 17 for alignment with an arrow 18 marked on the other arm 11. The arm 11 likewise, has a circular hub 19, with central opening 20 for the screw; the hubs 15 and 19 being of a same diameter and being of one half the thickness of a remainder of the arm so that the hub assembly is equal in thickness to the rest of the arms which are positioned to abut against each other along one side edges 21 thereof. The side edge 21 and an opposite side edge 22 are both marked out with a linear scale 23.

The mating edge 24 of one hub may be dovetailed with the other arm, as shown in FIG. 5, in order that no distortion between the arms is possible at this point, whereby accurate degree readings are made possible without any parallax.

As shown in FIG. 6, the longitudinal side edges 22 may each have a notch 25 along a lower portion thereof so to prevent ink blots upon a drawing surface 26 by a writing or ruling pen 27 in case the ink 28 gets on the arm side edges.

In use it is now evident that the arms can be spaced out from zero to 180° and locked at any position thereof. A friction washer 29 of rubber of flexed spring steel may be fitted around the screw 13 and between the hubs 15 and 19 for improved locking purposes.

In FIGS. 8 and 9, all the above described features are incorporated in a drafting quadrant 30, except that one arm 31 thereof incorporates a cross arm 32 on its end so to serve as a tee-square 33. Also instead of the large lock nut 14, two interfitting, countersunk heads screws 13a and 13b are employed so to be flush with opposite flat surfaces of the device so that, in use, it may be turned either side downwardly.

In FIGS. 10 and 11, still another locking means 34 is shown to fixedly hold the arms at a selected angle. Thus consists of one arm 35 having a notch 36 in which a wedge 37 is slidable so to be forcibly fitted between the hubs 38 and 39 of the arms, and thus resist pivotal movement therebetween.

The peripheral edge of the hub 38 may benotched as shown at 40 so to accommodate the wedge enter between the hubs. The wedge exposed upper surface 41 is knurlled so to be easily pushed by a finger 42. Thus a quicker lock means is provided and which holds at a substantial radial distance away from the pivot screws for a purpose of a stronger hold.

While various changes may be made in the detail construction, it is understood that such changes will be within the spirit and scope of the present invention as is defined by the appended claims.

What is claimed is:

1. A drafting quadrant comprising first and second similar flat arms, each arm having inner and outer parallel straight edges, said first arm having a circular lower disc at an outer end and said second arm having a similar upper disc at an outer end, wherein said discs are concentric and have opposing adjacent inner faces and spaced parallel outer faces forming coplanar extensions of said arms, said discs being axially secured together with a pivot pin to form a pivotable joint, including a nut threadedly mounted on said pin, and in abutment with the upper disc for locking purposes wherein the outer face of the upper disc is graduated in degrees with the 0 degree marking in alignment with the inner edge of the first said arm, said discs being one half the thickness of each arm and wherein each said outer edge is tangent to each disc whereby the periphery of the discs form a continuous smooth arcuate transition between the said outer edges, each arm including an arcuate guide offset from the inner face of each disc, wherein said guides slidingly abut the periphery of the adjacent disc for guiding pruposes, in further combination with a longitudinal sliding notch in the first said arm contiguous with the periphery of the upper disc including a wedge slidably mounted in said notch having a bevelled upper surface, said upper disc having a frustroconical inner surface complementary and opposite to said bevelled surface whereby movement of said wedge radially towards said upper disc causes said surface to abut said frustroconical surface of said upper disc thereby jamming the discs frictionally against the wedge and the pivot pin further preventing relative rotation.

* * * * *